United States Patent
He et al.

(10) Patent No.: US 9,466,092 B2
(45) Date of Patent: Oct. 11, 2016

(54) CONTENT-AWARE IMAGE ROTATION

(71) Applicant: Microsoft Corporation, Redmond, WA (US)

(72) Inventors: Kaiming He, Beijing (CN); Huiwen Chang, Beijing (CN); Jian Sun, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/092,032

(22) Filed: Nov. 27, 2013

(65) Prior Publication Data

US 2015/0147003 A1    May 28, 2015

(51) Int. Cl.
G06T 7/00      (2006.01)
G01N 23/20     (2006.01)
G06T 3/00      (2006.01)
G06T 3/60      (2006.01)

(52) U.S. Cl.
CPC ............. G06T 3/0012 (2013.01); G06T 3/60 (2013.01); G06T 3/608 (2013.01)

(58) Field of Classification Search
None
See application file for complete search history.

(56) References Cited

U.S. PATENT DOCUMENTS

| 6,934,422 | B2 | 8/2005 | Hamza |
| 8,270,771 | B2 | 9/2012 | Fillion et al. |
| 8,374,462 | B2 | 2/2013 | Jiang et al. |
| 2011/0182502 | A1 | 7/2011 | Liang |
| 2013/0128062 | A1 | 5/2013 | Jin et al. |

OTHER PUBLICATIONS

Chang et al. "A Line-Structure-Preserving Approach to Image Resizing," 2012 IEEE.*
Carroll et al. "Image Warps for Artistic Perspective Manipulation," 2009.*
Beier, et al., "Feature-Based Image Metamorphosis", In Proceedings of the 19th Annual Conference on Computer Graphics and Interactive Techniques, vol. 26, Issue 2, Jul. 1, 1992, pp. 35-42.
Carroll, et al., "Image Warps for Artistic Perspective Manipulation", In Journal of ACM Transactions on Graphics, vol. 29, Issue 4, Jul. 26, 2010, 9 Pages.
Carroll, et al., "Optimizing Content-Preserving Projections for Wide-Angle Images", In ACM Transactions on Graphics, vol. 28, Issue 3, Jul. 27, 2009, 9 Pages.
Igarashi, et al., "As-Rigid-As-Possible Shape Manipulation", In Proceedings of ACM Transactions on Graphics, vol. 24, Issue 03, Jul. 31, 2005, pp. 1134-1141.
Lee, et al., "Gaze Correction in Video Communication With Single Camera", In Proceedings of International Conference on Image Processing, vol. 3, Jun. 24, 2002, pp. 857-860.

(Continued)

*Primary Examiner* — Vu Le
*Assistant Examiner* — Alexander J Lesnick
(74) *Attorney, Agent, or Firm* — Sandy Swain; Micky Minhas (57) ABSTRACT

According to implementations of this disclosure, image content is rotated in a content-aware fashion. In one implementation, a mesh is formed over an image and image lines in the image content are identified. The image is warped using an energy function that rotates a subset of the lines a predetermined rotation angle, while rotating other lines by an angle other than the predetermined rotation angle. In one example, lines that are intended to be horizontal or vertical after correcting are rotated by a rotation angle that will make them horizontal or vertical, whereas oblique lines are rotated by an angle other than the rotation angle.

20 Claims, 6 Drawing Sheets

(56) References Cited

OTHER PUBLICATIONS

"International Search Report and Written Opinion Issued for PCT Patent Application No. PCT/US2014/066991", Mailed Date: Feb. 23, 2015, 8 Pages.

Yip, et al., "An Effective Eye Gaze Correction Operation for Video Conference Using Antirotation Formulas", In Proceedings of the Joint Conference of Fourth IEEE International Conference on Information, Communications and Signal Processing, and Fourth Pacific Rim Conference on Multimedia, vol. 2, Dec. 15, 2003, pp. 699-703.

Appelle, "Perception and Discrimination as a Function of Stimulus Orientation: the "Oblique Effect" in Man and Animals", Psychological Bulletin, American Psychological Association, Washington, D.C., US, vol. 78, No. 4, Oct. 1, 1972, pp. 266-278.

Avidan, Shai et al., "Seam Carving for Content-Aware Image Resizing" Published on Jul. 2007. Available at <<http://www.win.tue.nl/~wstahw/2IV05/seamcarving.pdf=>, 9 pages.

Barnes, Connelly et al., "Patchmatch: a Randomized Correspondence Algorithm for Structural Image Editing" In Papers of ACT SIGGRAPH, Published on Aug. 2009. Available at <<http://delivery.acm.org/10.1145/1540000/1531330/a24-barnes.pdf?ip=203.8.109.15&acc=ACTIVE%20SERVICE&key=C2716FEBFA981EF1193B1DAAE4F8BDAFA31CC7C692744019&CFID=339050693&CFTOKEN=64703985&_acm_=1371116184_ca26a0d5ce8fd7770d150a03f3f1737e>>, 12 pages.

Chang, Che-Han, et al., "A Line-Structure-Preserving Approach to Image Resizing", In Conference on Computer Vision and Pattern Recognition, Published Jun. 16, 2012. Available at <<http://ieeexplore.ieee.org/xpl/articleDetails.jsp?arnumber=6247786>>, 8 pages.

Chen, Shenchang Eric et al., "View Interpolation for Image Synthesis" In Proceedings of the 20th Annual Conference. on Computer Graphics and Interactive Techniques, Published Sep. 1993. Available at <<http://www.cs.columbia.edu/~ravir/6998/papers/p279-chen.pdf>>, 10 pages.

Darabi, Soheil et al., "Image Melding: Combining Inconsistent Images using Patch-based Synthesis" In Journal of ACM Transactions on Graphics—SIGGRAPH Conference, Published Jul. 2012. Available at <<http://delivery.acm.org/10.1145/2190000/2185578/a82-darabi.pdf?ip=203.8.109.15&acc=ACTIVE%20SERVICE&key=C2716FEBFA981EF1193B1DAAE4F8BDAFA31CC7C692744019&CFID=339050693&CFTOKEN=64703985&_acm_=1371121033_715fb067bb5eac5dd1a661280605766f>>, 10 pages.

Freeman, Michael, "The Photographers Eye: Composition and Design for Better Digital Photos" In Focal Press, Published on May 23, 2007. Available at <<http://mirror.paramadina.ac.id/pub/linux/doc/book/The%20Photographer%E2%80%99s%20Eye%20-%20Composition%20and%20Design%20for%20Better%20Digital%20Photos.pdf>>, 99 pages.

Gallagher, Andrew C., "Using Vanishing Points to Correct Camera Rotation in Images" In the 2nd Canadian.Conference on Computer and Robot Vision, Published May 9, 2005. Available at <<http://ieeexplore.ieee.org/stamp/stamp.jsp?tp=&arnumber=1443166>>, 8 pages.

Gioi, Rafael Grompone von, et al., "LSD: A Fast Line Segment Detector with a False Detection Control" In IEEE Transactions on Pattern Analysis and Machine Intelligence, vol. 32, Issue 4 Published Apr. 2010. Available at <<http://ieeexplore.ieee.org/stamp/stamp.jsp?tp=&arnumber=4731268>>, 11 pages.

Goldman, Dan et al., "Content-Aware Fill" Available at <<http://www.adobe.com/technology/projects/content-aware-fill.html>>, 1 page.

Goldmeier, E. "Similarity in visually perceived forms." Psychological Issues, 1972.

Guo, Yanwen, et al., "Image Retargeting Using Mesh Parametrization", In Journal of IEEE Transactions on Multimedia, Published Aug. 2009. Available at <<http://ieeexplore.ieee.org/stamp/stamp.jsp?arnumber=04907044>>, 12 pages.

He, Kaiming et al., "Statistics of Patch Offsets for Image Completion" In Proceedings of the 12th European Conference on Computer Vision, vol. 7572, Published Oct. 7, 2012. Available at <<http://research.microsoft.com/en-us/um/people/jiansun/papers/ECCV12_Completion.pdf>>, 14 pages.

Kopf, Johannes et al., "Locally Adapted Projections to Reduce Panorama Distortions" In Proceedings of the Twentieth Eurographics Conference on Rendering, vol. 28, Issue 4, Published Jun. 29, 2009. Available at <<http://johanneskopf.de/publications/projection/paper/local_projections_light.pdf>>, 7 pages.

Kopf, Johannes et al., "Quality Prediction for Image Completion" In Proceedings of ACM SIGGRAPH, Published Nov. 2012. Available at <<http://research.microsoft.com/en-us/um/people/kopf/completion/completion.pdf>>, 8 pages.

Krishnan, Dilip et al., "Fast Image Deconvolution using Hyper-Laplacian Priors" In 23rd Annual Conference on Neural Information Processing Systems, published Dec. 7, 2009. Available at <<http://machinelearning.wustl.edu/mlpapers/paper_files/NIPS2009_0341.pdf>>, 9 pages.

Lee, Hyunjoon, et al., "Automatic Upright Adjustment of Photographs" In IEEE Conference on Computer Vision and Pattern Recognition, Published Jun. 16, 2012. Available at <<http://www.cs.huji.ac.il/~peleg/CVPR2012/data/papers/111_P1C-03.pdf>>, 8 pages.

Liu, Feng et al., "Content-Preserving Warps for 3D Video Stabilization" In Journal of ACM Transactions on Graphics, Published Aug. 2009. Available at <<http://research.cs.wisc.edu/graphics/Papers/Gleicher/fliu/siggraph09_preprint_small.pdf>>, 9 pages.

Niu, Fenghui et al., "Content-Aware Image Rotation" In International Journal of Future Computer and Communication, vol. 2, Issue 1, Published Feb. 2013. Available at <<http://ijfcc.org/papers/107-F0002.pdf>>, 3 pages.

Nundy, Surajit et al., "Why are Angles Misperceived?" Published May 9, 2000. Available at <<http://www.pnas.org/content/97/10/5592.full>>, 8 pages.

The PCT Written Opinion of th IPEA mailed Jul. 19, 2015 for PCT application No. PCT/US2014/066991, 7 pages.

"Photoshop CC", Available at <<http://www.adobe.com/products/photoshop.html>>, 2 pages.

"Photoshop Help / Adjusting Crop, Rotation, and Canvas" Retrieved Jun. 11, 2013. Available at <<helpx.adobe.com/photoshop/using/adjusting-crop-rotation-canvas.html>>, 7 pages.

Rubinstein, Michael et al., "A Comparative Study of Image Retargeting" In Journal of ACM Transactions on Graphics, vol. 29, Issue 6, Published Dec. 2010. Available at <<http://people.csail.mit.edu/mrub/papers/retBenchmark.pdf>>, 9 pages.

Rubinstein, Michael et al., "Improved Seam Carving for Video Retargeting" In Journal of ACM Transactions on Graphics (TOG), Published Aug. 2008. Available at <<http://www.eng.tau.ac.il/~avidan/papers/vidret.pdf>>, 9 pages.

Rubinstein, Michael et al., "Multi-Operator Media Retargeting" In Journal of ACM Transactions on Graphics, vol. 28, Issue 3, Published Aug. 2009. Available at <<http://delivery.acm.org/10.1145/1540000/1531329/a23-rubinstein.pdf>>, 12 pages.

Wang, Yilun et al., "A New Alternating Minimization Algorithm for Total Variation Image Reconstruction" In Journal of SIAM Journal on Imaging Sciences, vol. 1, Issue 3 Published Jul. 2008. Available at <<http://www.caam.rice.edu/~yzhang/reports/tr0710_rev.pdf>>, 24 pages.

Wang, Yu-Shuen et al., "Optimized Scale-and-Stretch for Image Resizing" In First ACM SIGGRAPH Conference and Exhibition on Computer Graphics and Interactive Techniques in Asia, Published Dec. 10, 2008. Available at <<http://www.igl.ethz.ch/projects/retargeting/scale-and-stretch/resizing_sAsia.pdf>>, 8 pages.

Wexler, Yonatan et al., "Space-Time Completion of Video" In IEEE Transactions on Pattern Analysis and Machine Intelligence vol. 29, Issue 3, Published Mar. 2007. Available at <<http://ieeexplore.ieee.org/xpl/login.jsp?tp=&arnumber=4069262&url=http%3A%2F%2Fieeexplore.ieee.org%2Fxpls%Fabs_all.jsp%3Farnumber%3D4069262>>, 14 pages.

Wolf, Lior et al., "Non-homogeneous Content-driven Video-Retargeting" In IEEE 11th International Conference of Computer Vision, (56) References Cited

OTHER PUBLICATIONS

Published Oct. 14, 2007. Available at <<http://ieeexplore.ieee.org/stamp/stamp.jsp?tp=&arnumber=4409010>>, 6 pages.

Xiao, Yunhai et al., "Alternating Algorithms for Total Variation Image Reconstruction from Random Projections" In Inverse Problems and Imaging, vol. 6, Issue 3, Published Sep. 2012. Available at <<http://math.nju.edu.cn/~jfyang/files/FTVCS2009.pdf>>, 17 pages.

Zhang, Guo-Xin et al., "A Shape-Preserving Approach to Image Resizing" In Computer Graphics Forum, vol. 28, Published Mar. 2009. Available at <<http://citeseerx.ist.psu.edu/viewdoc/download?doi=10.1.1.154.2785&rep=rep1&type=pdf>>, 10 pages.

"International Preliminary Report on Patentability Issued in PCT Application No. PCT/US2014/066991", Mailed Date: Oct. 16, 2015, 8 Pages.

\* cited by examiner

CONTENT-AWARE IMAGE ROTATION

BACKGROUND

Digital images, especially casually shot digital images, often appear tilted or rotated. Conventional image editing techniques correct for unwanted tilt by rotating the image about the tilt angle, and cropping the resulting tilted image to a desired size or aspect ratio, i.e., to provide a conventionally-shaped rectangular boundary. However, the cropping step necessarily removes content. In some instances, 20% of the original content can be removed by a rotation of 5-degrees and subsequent cropping. Other methods have attempted to add content, instead of cropping, and with varied success. In yet another proposed solution, seams are created within the image content and content is either added or removed at those seams. In each of these solutions, the corrected image has other than original image content, either because content has been removed or added.

SUMMARY

This application describes example embodiments of image rotation correction. In various embodiments, a user may identify an image for rotation-based image correction. In some embodiments, an image-rotation correction system forms an input mesh over the image content. The input mesh may have a boundary corresponding to an original boundary of the image content. In some embodiments, after the mesh has been applied, the correction system optimizes the mesh according to an energy function. In one embodiment, the energy function may have rotational preservation, line preservation, shape preservation, and boundary preservation terms. For example, the line preservation term may include both a rotation term and a smoothness term, which together dictate different, but interrelated rotation for different groups of lines. In one embodiment, the energy function requires that the correction system rotate horizontal and vertical lines about a fixed rotation angle and all other, oblique lines about some different angle. The correction system may then deform the image content according to the optimized mesh, to produce a corrected image. In some embodiments, the image content of the input image and of the corrected image is the same, which means the mesh optimization does not add or remove content.

This summary introduces simplified concepts of content-aware image rotation correction, which are further described below in the Detailed Description. This summary is not intended to identify essential features of the claimed subject matter, nor is it intended for use in limiting the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As noted above, images, especially those captured casually, may have an unwanted tilt. Human vision studies teach that the perception of image tilting is due to a tilted horizon (or other horizontal lines). The human eye is much more sensitive to right angles that are normal, i.e., having one horizontal leg and one vertical leg, than to all other, oblique, right angles. Vision studies also teach that humans do not well perceive the absolute values of angles that are acute or obtuse.

Using these studies, implementations of this disclosure seek to rotate content in such a manner that lines that a user expects to be vertical and horizontal are made vertical and horizontal, respectively, while other lines are allowed greater rotational flexibility. The result is an aesthetically pleasing result, despite the deformation of some of the image content.

This disclosure describes an image rotation correction system, which employs content-aware rotation image processing to rotate original image content in a quick and effective manner. The corrected image may include all of the original image content, without the need to crop or fill spaces after rotation, for example.

According to aspects of the invention, a mesh is formed over an image for warping and image lines in the image content are identified. The image is warped using an energy function that rotates a subset of the lines a predetermined rotation angle, while rotating other lines by an angle other than the predetermined rotation angle. In one example, lines that are intended to be horizontal or vertical after correcting are rotated by a rotation angle that will make them horizontal or vertical, whereas oblique lines are rotated by an angle other than the rotation angle. The oblique lines may be grouped according to their orientation in some implementations, such that the groupings are treated similarly.

In some implementations, the energy function includes multiple terms. For example, in an example framework described below, the energy function may include a rotation preservation term encouraging preservation of a rotation of the image content to counteract for the rotation about a rotation angle, a line preservation term defining a relationship between the lines and vertexes of the mesh, a shape preservation term that urges continuity of certain shapes after deformation, and/or a boundary preservation term to constrain the optimized mesh to the boundary of the image content or some other boundary.

The application describes multiple and varied implementations and embodiments. The following section describes an example environment that is suitable for practicing various implementations. Next, the application describes example systems, devices, and processes for implementing an image rotation correction system.

Exemplary Environment

Figure 1:
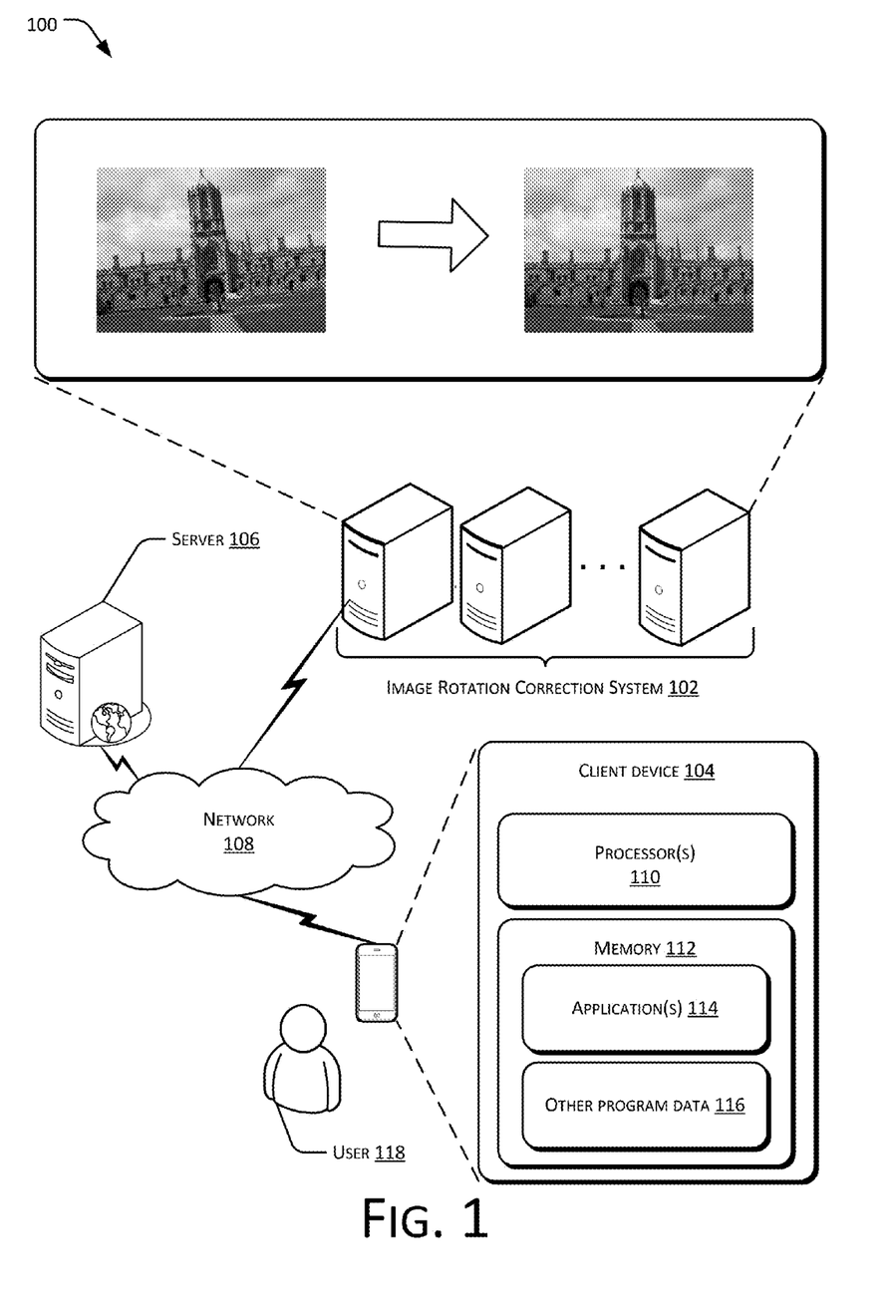
FIG. 1 illustrates an example environment including an example image rotation correction system.

FIG. 1 illustrates an exemplary environment 100 usable to implement an image rotation correction system 102. In one embodiment, the environment 100 may include a client device 104, a server 106 and a network 108. The client device 104 and/or the server 106 may communicate data with the image rotation correction system 102 via the network 108.

Although the image rotation correction system 102 in FIG. 1 is illustrated as being separate from the client device 104 and the server 106, in one embodiment, functions of the image rotation correction system 102 may be included and distributed among one or more client devices 104 and/or one or more servers 106. For example, the client device 104 may include part of the functions of the image rotation correction system 102 while other functions of the image rotation correction system 102 may be included in the server 106. In some embodiments, all the functions of the image rotation correction system 102 may be included in the client device 104 or on the server 106.

The client device 104 may be implemented as any of a variety of conventional computing devices including, for example, a notebook or portable computer, a handheld device, a netbook, an Internet appliance, a portable reading device, an electronic book reader device, a tablet or slate computer, a game console, a mobile device (e.g., a mobile phone, a personal digital assistant, a smart phone, etc.), a media player, etc. or a combination thereof.

The network 108 may be a wireless or a wired network, or a combination thereof. The network 108 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANs). Further, the individual networks may be wireless or wired networks, or a combination thereof.

In the illustrated embodiment, the device 104 includes one or more processors 110 coupled to memory 112. The memory 112 includes one or more applications 114 (e.g., an image capturing application, an image rotation correction application, etc.) and other program data 116. The memory 112 may be coupled to, associated with, and/or accessible to other devices, such as network servers, routers, the server 106, and/or other client devices (not shown).

The one or more processors 110 may include a central processing unit (CPU), a graphics processing unit (GPU), a microprocessor, a digital signal processor, and so on. The memory 112 may be configured to store one or more software and/or firmware modules, which are executable on the one or more processors 110 to implement various functions. The term "module" is intended to represent example divisions of the software for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.).

Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc.

A user 118 of the client device 104 may receive an image into the client device 104 through an image acquisition application. For example, the client device 104 may include an image capture application through which the user captures images. The image capture application may be associated with a camera incorporated into the device, and captured images may be stored on the device 104. In other implementations, the user may receive an image on the device from some other source, for example, the image acquisition application may include a messaging application, a social media application, a browsing application, or so forth. The image acquisition application in these examples may act as a front-end application that obtains or otherwise provides an image that will be presented to the image rotation correction system 102, which may act as a backend application.

In response to receiving the image from the image acquisition application, the image rotation correction system 102 may process the image by applying a content-aware rotation to the image content. The image rotation correction system 102 may correct for unwanted rotation, which may result from tilted image acquisition, for example. In some embodiments, the image rotation correction system 102 may be used as an editing tool to apply a desired aesthetic effect, such as a desired rotation other than a corrective rotation, to the image content.

Figure 2:
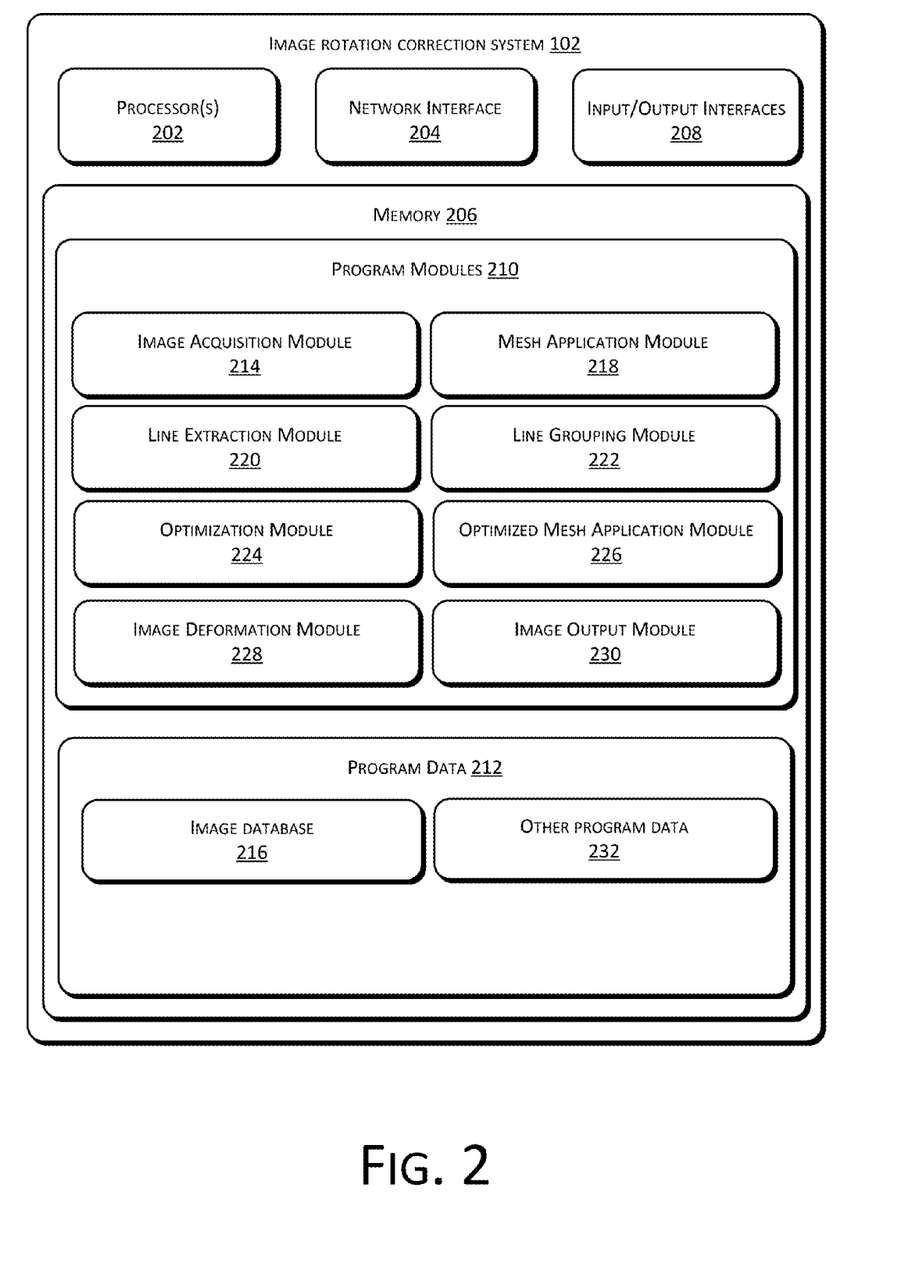
FIG. 2 illustrates the example image rotation correction system of FIG. 1 in more detail.

FIG. 2 illustrates the image rotation correction system 102 in more detail. In one embodiment, the image rotation correction system 102 includes, but is not limited to, one or more processors 202, a network interface 204, memory 206, and an input/output interface 208. The processors 202 are configured to execute instructions received from the network interface 204, received from the input/output interface 308, and/or stored in the memory 206. The processors 202 may be the same as or different from the processors 110 of FIG. 1, and the memory 206 may be the same as or different from the memory 112 of FIG. 1.

The memory 206 (and the memory 112) includes tangible and/or physical forms of media included in a device and/or hardware component that is part of a device or external to a device, including but not limited to random-access memory (RAM), static random-access memory (SRAM), dynamic random-access memory (DRAM), read-only memory (ROM), erasable programmable read-only memory (EPROM), electrically erasable programmable read-only memory (EEPROM), phase change memory (PRAM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

Although the memory 112, 206 are depicted in the figures as single units, the memory 112 and/or 206 (and all other memory described herein) may include computer storage media or a combination of computer storage media and other computer-readable media. Computer-readable media may include computer storage media and/or communication media. Computer storage media includes volatile and non-volatile, removable and non-removable media implemented in any method or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disk (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

The memory 206 may include program modules 210 and program data 212. In one embodiment, the program modules 210 include an image acquisition module 214. The image acquisition module 214 may obtain or retrieve image data corresponding to a digital image, for example, from the memory 112 on the client device 104. Additionally or alternatively, the acquisition module 214 may obtain or retrieve image data from the server 106. The image data may include, but is not limited to, digital images captured using a camera on the client device 104. The digital images may alternatively be obtained from some other source.

The digital images generally contain image content that is bound by an image boundary. The image boundary may be determined by the technique or device used to capture the image, by the user, by some pre-processing of the image carried out before acquisition of the image content at the image rotation correction system 102, or by some other method.

The image content of each of the acquired images may be rotated about a rotation angle $\Delta$. For example, if the capturing device used to capture an acquired image was tilted by $\Delta$, e.g., because of carelessness on the capturer's part, the acquired image will be tilted by $\Delta$. In some aspects of this disclosure, the image rotation correction system 102 is used to correct for this unwanted $\Delta$.

The image rotation correction system 102 may further include a mesh application module 218, which applies an input mesh to the digital image. In one embodiment, the mesh application module 218 applies a uniform mesh, such as a grid, defining a plurality of quadrants. Once applied to the image, each quadrant corresponds to a section of the digital image. The quadrants may be any shape or size. In one embodiment, the input mesh has a mesh boundary corresponding to the image boundary. However, in other implementations, the mesh application module 218 may apply the mesh to less than the entire acquired image. For example, the user may choose to implement the techniques of this disclosure on less than the entire input image. In such an embodiment, the user may define the section of the input image to be corrected, for example, via a user interface on the client device to define the image boundary. As another example, an image processing program may cause implementation of the techniques of this disclosure on less than the entire input image.

The program modules 210 may further include a line extraction module 220. The line extraction module 220 may extract lines from the image, for example, using one or more extraction techniques, such as edge detection, corner detection, blob detection, ridge detection and/or scale-invariant feature transform. Moreover, although this disclosure describes a line extraction module 220, those having ordinary skill in the art with the benefit of this disclosure will understand that aspects of the disclosure may lend themselves to extractions other than or in addition to line extraction. For example, shapes and/or features may also be extracted and manipulated. For example, features other than lines, may be extracted from an acquired image using shape-based detection, which may include thresholding, blob extraction, template matching, and/or Hough transform, for example.

The extracted lines may then be grouped according to one or more of their properties, using a line grouping module 222. For example, the lines may be grouped according to their orientation. In one implementation, each of the extracted lines is grouped into a "bin" according to its angle of rotation relative to an axis, such as a horizontal axis. For instance, the lines may be grouped into ninety bins, each bin including lines within 2-degrees of rotation of each other. The line grouping module may further define two of the groupings or bins as horizontal and vertical bins. The horizontal bin includes lines that are intended to be horizontal after the image is corrected using the image rotation correction system 102, and the vertical bin includes lines that are intended to be vertical after the image is corrected. In an example in which the image content is rotated or tilted by the rotation angle $\Delta$, and the user desires to correct the image for that unwanted tilt, the horizontal and vertical bins will include lines that, when rotated by the rotation angle $\Delta$, will appear horizontal and vertical, respectively, in the corrected image.

The program modules 210 may also include an optimization module 224, which optimizes an energy function to determine an optimized mesh. The energy function may include a plurality of terms including a rotation preservation term, a line preservation term, a shape preservation term, and a boundary preservation term. In some implementations, the rotation preservation term may encourage rotation of the image content (including the extracted lines) about the rotation angle $\Delta$. The rotation preservation term may also include a smoothness term, which promotes similar rotations for lines grouped in adjacent or close bins. The rotation preservation term may be designed such that lines in the horizontal and/or vertical bins are strictly rotated about the rotation angle $\Delta$, whereas lines in other bins are rotated by an angle other than the rotation angle $\Delta$.

The line preservation term may build a relationship between the extracted lines and vertexes of the input mesh.

The shape preservation term may require that each mesh quadrant undergo a similarity transform. Some transforms, such as "as-rigid-as-possible" are known, and may be used. In such a transform, distortion of each mesh quadrant may be minimized to retain shapes. In other implementations, the similarity transformation may use an "as-similar-as-possible" transform. An example of such a transform is used in the example energy function described in more detail, below.

The boundary preservation term may constrain the mesh boundary vertexes to a determined boundary. For example, the mesh boundary vertexes may be constrained to the image content boundary. In this manner, the output image has the same boundary as the input image, which may obviate the need for cropping the output image. In other implementations, it may be possible to constrain the mesh boundary vertexes to some other pre-defined boundary.

As will be described in more detail below, the optimization module 224 may optimize the energy function using an alternating algorithm. The optimization module 224 may further use a half-quadratic splitting technique. An example half-quadratic splitting technique will also be described below.

Optimizing the energy function describes an optimized mesh, which may be applied to the image content using an optimized mesh application module.

The program modules 210 may further include an image deformation module 228, which deforms the acquired input image to fit to the optimized mesh. The image deformation module 228 may use bilinear interpolation, for example.

An image output module 230 may also be provided, for outputting the corrected image, for example, to the user 118 through the client device 104.

In other implementations, the program data 212 may further include other program data 232, which may or may not be relevant to line detection and grouping and/or the energy function. By way of example and not limitation, the other program data 232 may include user-preferred or otherwise pre-established parameters that may be used to facilitate correction of a new acquired image.

Example Framework

An example framework for content aware image rotation is described hereinafter.

In one aspect of an image correction apparatus, such as the image rotation correction system 102, described above, it may be desirable to rotate image content to correct for unintended rotation or tilt. In this example framework, image content in an acquired image is rotated by a rotation angle $\Delta$, and the image content is to be corrected for this rotation angle $\Delta$. In this framework, the rotation angle $\Delta$ is an angle by which lines that "should" be horizontal and vertical, i.e., but for the unwanted rotation, are rotated relative to "true" horizontal and vertical, respectively. Thus, rotation of the horizontal and vertical lines by the rotation angle $\Delta$, will cause those lines appear to be horizontal and vertical. In this framework, the rotation angle $\Delta$ is known, having been input by the user or obtained from some other source. For example, an angle of tilt of the device used to acquire the image may be known to and conveyed by the device. In another implementation, the user may interact with the image to define a line, for example, an extracted line, to denote that the line should be horizontal or vertical.

In the example framework, lines are identified in the acquired image, such as by the line extraction module 220. As necessary, longer lines are segmented into smaller lines (i.e., line segments) at intersections with the input mesh such that each line resides in only a single mesh quadrant. Lines already residing in only a single quadrant of the mesh are not segmented.

Having defined each of the lines, an orientation of each of the lines is determined relative to a reference axis. In this example framework, the reference axis is an x-axis of the input image, and orientations of the lines are relative to this x-axis. The orientations are offset by periods of $\pi$, such that they are in the range $[-\Delta, \pi-\Delta)$ in the input image. Accordingly, an output image acquired by rigidly rotating the image content by $\Delta$ would have these lines in the range $[0, \pi)$ in the output image.

The lines are then grouped, such as using the line grouping module 222. In this example, the range $[-\Delta, \pi-\Delta)$ is uniformly quantized into M=90 bins, each covering $\pi/90$, or 2-degrees. According to this grouping, all of the segments that made up a line segmented by the mesh will be included in the same bin, as will parallel lines. The energy function will encourage all lines in the same bin to follow a common expected rotation angle, such that those longer lines maintain their linearity and parallel lines maintain their parallelism. The expected rotation angle in the m-th bin is $\theta_m$. The set $\{\theta_m\}_{m=1}^{M}$ forms an M×1 vector $\theta$. The lines in the ṁ-th bin are those that would become horizontal/vertical after correction of the image, for ṁ=1, M (horizontal) or M/2, M/2+1 (vertical). These four bins may be referred to as "canonical" bins and in some implementations of this disclosure, those bins are rotated by the angle of rotation, $\Delta$.

With the lines determined and grouped, the example framework then provides an energy function. The energy function preferably encourages strict rotation, by $\Delta$, of the lines in the canonical bins. This rotation may create a good visual perception of rotation of the corrected image. The function also may constrain the vertexes in the mesh to the boundary of the output. In this manner, for example, all of the content of the original image will be present in the corrected image. That is, the content after correction will not be smaller (and thus require the addition of content) or larger (and thus require cropping) than the established boundary. The energy function may also minimize local distortion.

From the original image mesh, which in this example is a quad mesh, the position of a vertex is $v_i=(x_i, y_i)^T$ and all vertexes $\{v_i\}$ are concatenated into a vector V.

The energy function in this example framework is with respect to V and $\theta$ and it has a rotation preservation term, a line preservation term, a shape preservation term, and a boundary preservation term. These terms will now be described in detail.

The rotation preservation term provides an energy $E_R$ and it encourages the preservation of the desired rotation. It is given as:

$$E_R(\theta)=\Sigma_m \delta_m (\theta_m-\Delta)^2 + \Sigma_m (\theta_m - \theta_{m+1})^2 \quad (1)$$

In equation (1), the first term is a data term that encourages rotation of the lines to follow $\Delta$. $\delta_m$ is a weighting factor that may be larger for canonical bins, i.e., such that the rotation of those bins closely approximates $\Delta$. In one embodiment, $\delta_m=10^3$ for canonical bins and equals zero for all other bins. This imposes strong constraints on the horizontal and vertical bins, but other weighting factors may also be used.

The second term of equation (1) is a smoothness term, which encourages similarity of rotation for lines in adjacent bins. At the bins next to the canonical bins, this term smoothly propagates the impact of the rigid rotation of the canonical bins.

As will be appreciated, the energy $E_R(\theta)$ allows non-canonical bins to rotate at angles other than $\Delta$. This allows for adaptive, non-rigid rotation. The energy $E_R(\theta)$ is quadratic on the vector $\theta$.

The next term in the energy equation is a line preservation term. This term builds a relationship between the lines and the mesh vertexes. Specifically, for a k-th detected line, endpoints may be represented as bilinear interpolations of four mesh vertexes. A directional vector $e_k$ may be computed as the difference of the two endpoints. Accordingly, $e_k$ may be written as a linear function of the vertexes V ($e_k=P_k V$ for some $P_k$). Where $u_k$ denotes the directional vector of this line in the input image, and denoting the bin of this line as m(k) with the expected rotation angle $\theta_{m(k)}$, equation (2) gives the energy measuring the distortion of line rotation:

$$E_L(V, \theta, s) = \frac{1}{k} \sum_k \|s_k R_k u_k - e_k\|^2 \quad (2)$$

In this equation, K is the number of lines, $s_k$ is a scale associated with the line k, and $R_k$ is the rotational matrix:

$$\begin{bmatrix} \cos\theta_{m(k)} & -\sin\theta_{m(k)} \\ \sin\theta_{m(k)} & \cos\theta_{m(k)} \end{bmatrix}. \quad (3)$$

According to the equation, the input vector $u_k$ is rotated by $\theta_{m(k)}$ and scaled by $s_k$, and its distortion from $e_k$ is measured.

Assuming that the scale $s_k$ independent, we minimize $E_L$ with respect to each $s_k$, which yields $s_k = (u_k^T u_k)^{-1} u_k^T R_k^T e_k$.

Substituting $s_k$ into Equation (2), then, yields:

$$E_L(V, \theta) = \frac{1}{k} \sum_k \|(R_k U_k R_k^T - I)e_k\|^2 \quad (4)$$

where I is a unit matrix, and $U_k = (u_k^T u_k)^{-1} u_k^T$. In theory, this term encourages the angle between $e_k$ and $u_k$ to be $\theta_{m(k)}$, such that the line is to be rotated by $\theta_{m(k)}$.

In the example framework, this line preservation term is decoupled from s, to obtain a closed-form on V and θ. In this manner, the nonlinearity of θ may be more readily optimized. Moreover, the energy $E_L(V, \theta)$ is quadratic on V.

In this framework, the shape preservation term includes a similarity transformation, which is an "as-similar-as-possible" transformation. The shape preservation energy $E_S$ is:

$$E_S(V) = \frac{1}{N} \sum_q \|(A_q (A_q^T A_q)^{-1} A_q^T - I)V_q\|^2, \quad (5)$$

where N is the quad number and q is a quad index. Defined on the quad q, the 8×4 matrix $A_q$ and the 8×1 vector $V_q$ are:

$$A_q = \begin{bmatrix} \hat{x}_{q,0} & -\hat{y}_{q,0} & 1 & 0 \\ \hat{y}_{q,0} & \hat{x}_{q,0} & 0 & 1 \\ \vdots & \vdots & \vdots & \vdots \\ \hat{x}_{q,3} & -\hat{y}_{q,3} & 1 & 0 \\ \hat{y}_{q,3} & \hat{x}_{q,3} & 0 & 1 \end{bmatrix}, V_q = \begin{bmatrix} x_{q,0} \\ y_{q,0} \\ \vdots \\ x_{q,3} \\ y_{q,3} \end{bmatrix}. \quad (6)$$

Here, $(x_{q,0}, y_{q,0}), \ldots, (x_{q,0}, y_{q,0})$ denote the four vertexes of a deformed quad, and $(\hat{x}_{q,0}, \hat{y}_{q,0}), \ldots, (\hat{x}_{q,3}, \hat{y}_{q,3})$ those of the input quad. The energy $E_S$ is a quadratic function of V.

The final term in the energy equation is a boundary preservation term. In this example framework, the boundary preservation term maintains the image content in an upright rectangular boundary. The term constrains the boundary vertexes on this rectangle according to:

$$E_B(V) = \Sigma_{i \in left} x_i^2 + E_{i \in right}(x_i - w)^2 + \Sigma_{i \in top} y_i^2 + \Sigma_{i \in bottom}(y_i - h)^2 \quad (7)$$

In equation (7), each summation is over the vertexes on each boundary. The values w and h are the width and height of an upright rectangle. The rectangle in this example may correspond to the rectangle bounding the input image, or it may be some other defined boundary. $E_B(V)$ is quadratic on V.

From the four just-described terms, the total energy $E(V, \theta)$ to be optimized is stated as follows:

$$E(V,\theta) = E_S(V) + \lambda_B E_B(V) + \lambda_L E_L(V,\theta) + \lambda_R E_R(\theta) \quad (8)$$

In some implementations, $\lambda_B = \infty$ ($10^8$) to define a hard boundary constraint. $\lambda_L$ and $\lambda_R$ may be fixed parameter settings, as may be known. In some implementations, a value of 100 has been found to work well.

In one implementation, an alternating algorithm is used to optimize the energy, $E(V, \theta)$. Specifically, the problem may be divided into two sub problems, with each being iteratively optimized.

First, θ is fixed, and the problem is solved for V. In this instance, E is a quadratic function on V. The solution is given by a sparse linear system, where V consists of several hundreds of unknowns.

Next, V is fixed and the problem is solved for θ. Optimization then comes from minimizing:

$$\min_\theta \frac{\lambda_L}{K} \sum_k \|(R_k U_k R_k^T - I)e_k\|^2 + \lambda_R E_R(\theta). \quad (9)$$

The first term is nonlinear, and thus the solution is non-trivial. In one implementation, this nonlinear problem may be solved using a half-quadratic splitting technique. To do so, a series of auxiliary variables $\phi = \{\phi_k\}_{k=1}^K$ are used. Each $\phi_k$ denotes the individual rotation angle of line k (whereas $\theta_m$ is the common rotation angle of the lines in bin m). Denoting $$\hat{R}_k = \begin{bmatrix} \cos\theta_k & -\sin\theta_k \\ \sin\theta_k & \cos\theta_k \end{bmatrix}$$

as the individual rotation matrix of line k, Equation (9) is rewritten as:

$$\min_{\theta,\phi} \frac{\lambda_L}{K} \sum_k \|(\hat{R}_k U_k \hat{R}_k^T - I)e_k\|^2 + \beta \sum_k (\phi_k - \theta_{m(k)})^2 + \lambda_R E_R(\theta). \quad (10)$$

β is a penalty weight, and when β→∞, the solution to Eq. (10) converges to Eq. (9). The half-quadratic splitting technique may warm up from a small β and gradually increase to ∞. In each step when β is set, the problem in Eq. 10 is split into two sub problems.

In particular, when φ is fixed and θ is updated, the first subproblem is:

$$\min_\theta \beta \Sigma_k (\phi_k - \theta_{m(k)})^2 + \lambda_R E_R(\theta), \quad (11)$$

Which is a quadratic function on θ, and is solved by a linear system, in which θ has 90 (the number of bins) unknowns.

The second subproblem, i.e., when φ is updated and θ is fixed, is nonlinear, but each $\phi_k$ is independent and thus can be solved separately. The second subproblem is:

$$\min_{\phi_k} \frac{\lambda_L}{K} \sum_k \|(\hat{R}_k U_k \hat{R}_k^T - I)e_k\|^2 + \beta(\phi_k - \theta_{m(k)})^2. \quad (12)$$

This is a single variable problem, which may be solved using a gradient descent method, for example. Alternatively, a look-up method may be used. If β=0, the first term is solved by the angle between $e_k$ and $u_k$ and if β→∞, it solved by $\phi_k = \theta_{m(k)}$. The problem in Eq. 12 trades off between these two values. In one implementation, the range [∠($e_k$, $u_k$, $\theta_{m(k)}$] may be divided into a plurality of discrete values, the cost in Eq. (12) may be evaluated, and the value for $\phi_k$ may be chosen that minimizes the cost. In one implementation, the inventors used 100 discrete values, and the result was a straightforward solution.

The example energy function may be optimized according to an algorithm such as:

```
Algorithm 1: Optimization
 1:  Initialize θ.
 2:  for iter = 1 to itermax do
 3:      Fix θ, solve for V due to (8).
 4:      Fix V. Set β = β₀.
 5:      while β < βmax do
 6:          Fix θ, solve for φₖ in (12) for all k.
 7:          Fix φ, solve for θ due to (11).
 8:          Set β = β · β_inc
 9:      end while
10:  end for
```

As will be appreciated, according to this example framework lines in the canonical bins are rotated strictly, i.e., by the rotation angle $\Delta$, whereas rotation of lines in all other bins is less constrained. The result is an aesthetically pleasing because horizontal and vertical lines, which users are more perceptive of, appear correct.

Graphical Examples

Figure 3:
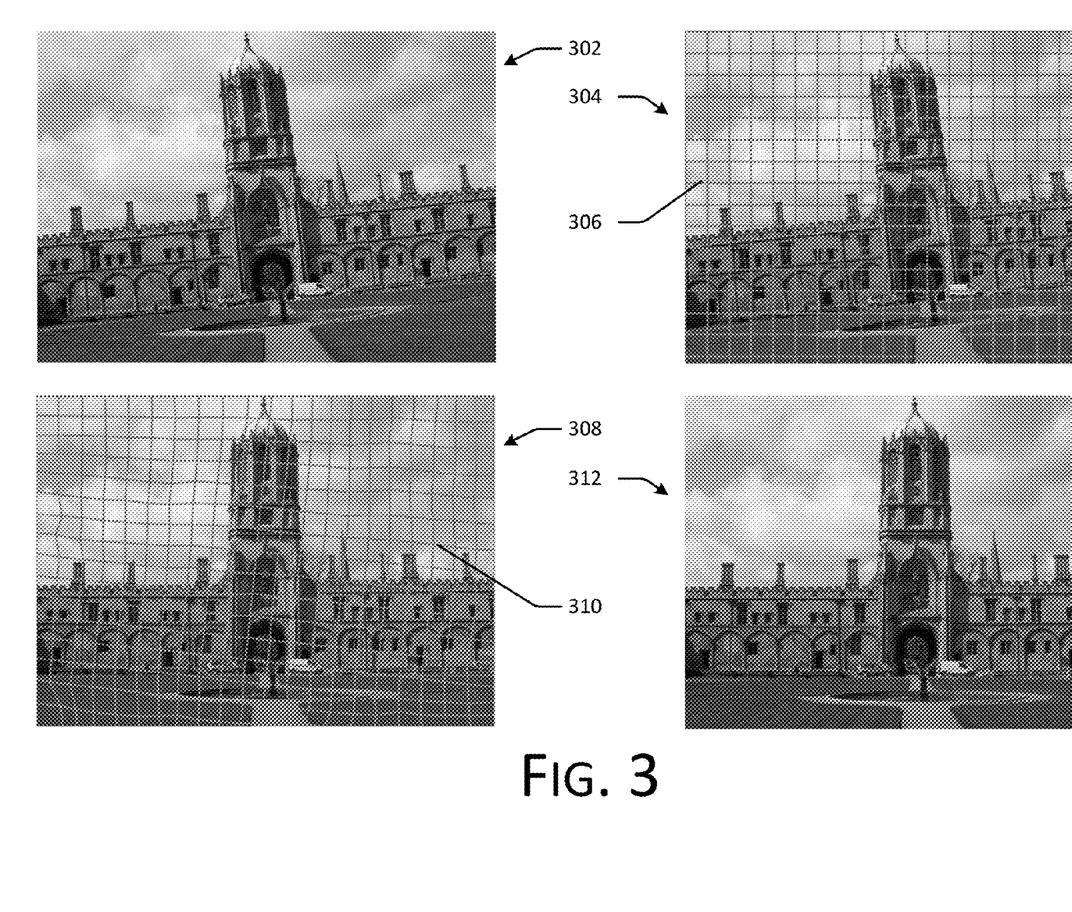
FIG. 3 illustrates an example scenario of editing received image content according to an implementation of this disclosure.

FIG. 3 illustrates a first example of an image correction process using a system like the example framework just described.

An input image 302 is provided. The input image is unsatisfactory, because it is rotated or tilted. For example, the user may have been careless when capturing the image.

An input mesh image 304 is then formed by placing a mesh 306 over the input image 302. As illustrated, the input mesh 306 consists of a number of equivalently-sized, square quadrants. In other implementations, the mesh may have quadrants of different size and/or shape, and the quadrants need not be uniform.

An optimized mesh image 308 is also illustrated, in which the initial mesh has been optimized to create an optimized mesh 310. In this example, the mesh was optimized using the example framework described above.

Removing the optimized mesh 310 yields a corrected image 312. In the corrected image, the content appears to be rotated to merely correct for the tilt angle, but because only the horizontal and vertical lines are rigidly rotated about the tilt angle, all of the original content may be retained in the corrected image.

Figure 4:
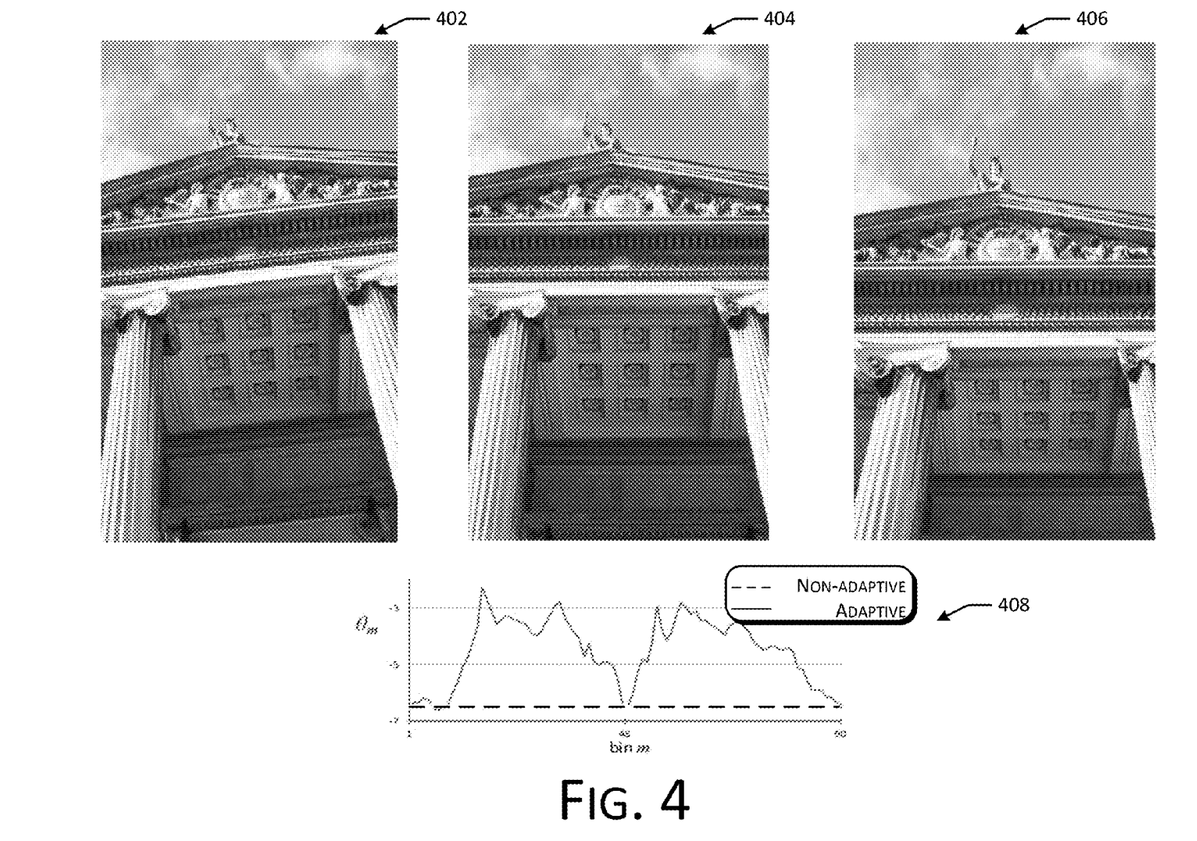
FIG. 4 illustrates a comparative example of editing a received image according to an implementation of this disclosure and editing the received image using a conventional technique.

FIG. 4 illustrates another example in which an input image 402 has been corrected for unwanted rotation. Here, the rotation angle is 7-degrees. At 404, the original image has been corrected according to the example framework described above. 406 shows an example using a conventional rotate and crop editing. As illustrated, the original content of image 402 is present in the corrected image 404, but much of the original content is missing in the corrected image 406.

Reference number 408 shows a chart illustrating the adaptive rotation techniques described above in the example framework. More specifically, The chart illustrates a rotation angle of each of 90 bins of lines, grouped according to the method described above. As illustrated, in the adaptive technique illustrated in the corrected image 404, lines in bins 1, 45, and 90 are rotated about the rotation angle (here, 7-degrees), whereas lines in the other bins may rotated about some different angle, because of the energy function described above. In fact, some bins are rotated less than 3-degrees. Contrast this with the corrected image 406, formed using a non-adaptive approach, i.e., in which all lines are rotated by 7-degrees. The corrected image 404 is aesthetically pleasing, yet retains all of the original content, compared to the corrected image 406, which may be rotationally correct, but at the expense of losing some content.

Exemplary Methods

Figure 5:
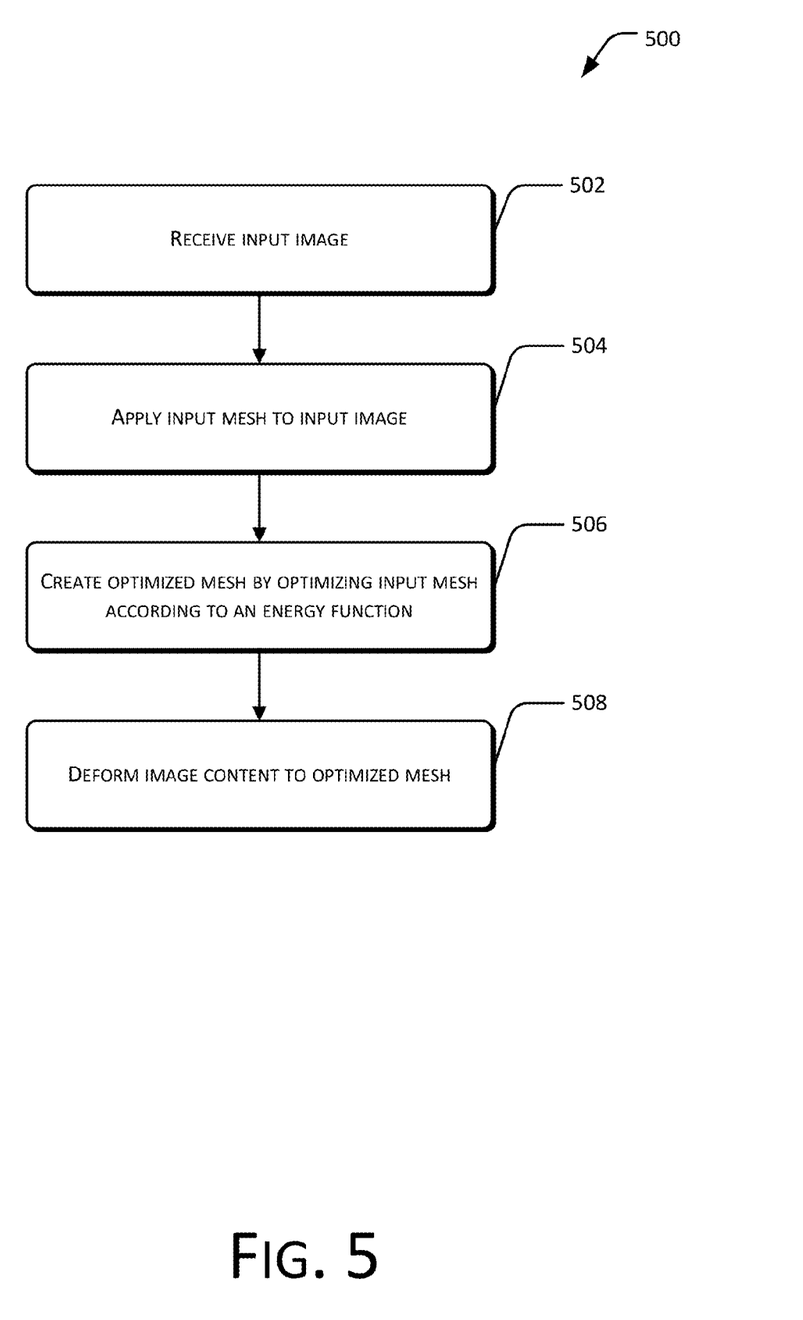
FIG. 5 illustrates an example method of content-aware rotation of image content.
Figure 6:
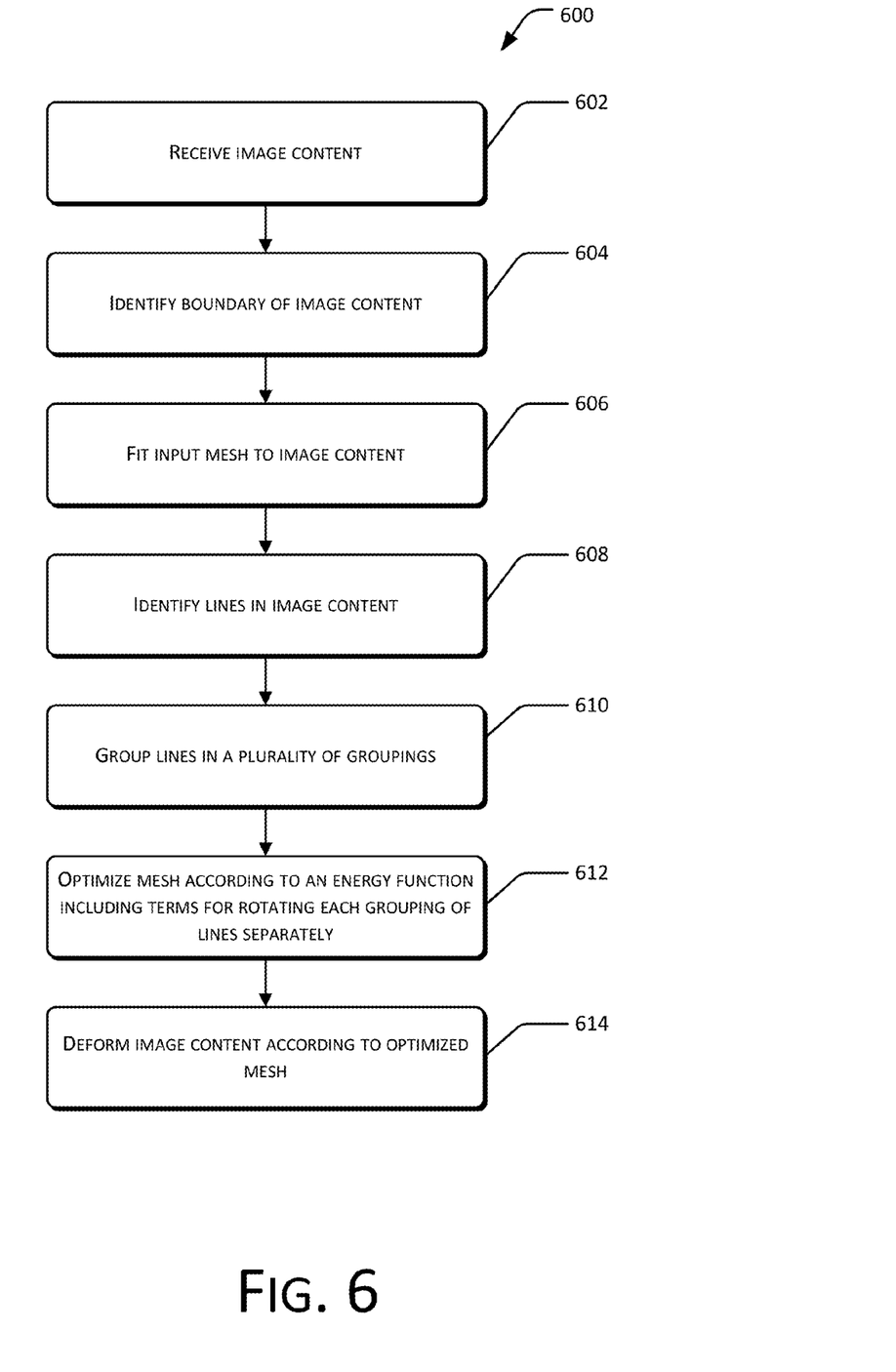
FIG. 6 illustrates an example method of content-aware rotation of image content.

FIGS. 5 and 6 are flowcharts depicting example methods 500, 600 of correcting an image using an image rotation correction system. The methods of FIG. 5 and FIG. 6 may, but need not, be implemented in the environment of FIG. 1 and using the system of FIG. 2. For ease of explanation, the methods 500, 600 are described with reference to FIGS. 1 and 2. However, the methods 500, 600 may alternatively be implemented in other environments and/or using other systems.

The methods 500, 600 are described in the general context of computer-executable instructions. Generally, computer-executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Referring back to FIG. 5, at block 502, the image rotation correction system 102 may receive an input image, such as from a client device 106. In other embodiments, the image rotation correction system 102 may receive the image data from the image database 216 or from a database in other systems such as the server 106.

At block 504, in response to receiving the image, the image rotation correction system 102 applies an input mesh to the input image. In one embodiment, the input mesh is a uniform mesh having a boundary corresponding to a boundary of the image.

At block 506, the image rotation correction system 102 may optimize the input mesh to create an optimized mesh. The mesh is optimized according to an energy function. In one embodiment, the energy function includes line preservation, rotation preservation, shape preservation, and boundary preservation terms. The energy function may be solved using a half-quadratic splitting technique.

At block 508, the image content is deformed according to the optimized mesh. This results in a corrected image, in which certain lines in the original image content are strictly rotated, for example, about a pre-defined rotation angle, whereas other lines are rotated about some other angle.

Referring now to FIG. 6, at block 602, the image rotation correction system 102 may receive an input image, such as from the client device 104.

At block 504, in response to receiving the input image, the image rotation correction system 102 may identify a boundary of the image content. The boundary may be, for example, a rectangle or other shape defining the perimeter of the image. In other implementations, the boundary may denote less than the entire input image. For example, the boundary may only encircle a portion of the image content, so only that portion will be subject to correction by the image rotation correction system 102. In some implementations, such a portion may be automatically defined, for example, using a shape or other recognition tool (e.g., to recognize certain features, such as a face) or the portion may be user defined, for example, using an input interface on the client device 106. The boundary preferably identifies the content to be corrected.

At block 606, an input mesh is fit to the image content identified by the boundary. In one example, the input mesh has a mesh boundary that corresponds to the boundary identified at block 604.

At block 608, lines in the image content are identified. The lines may be identified using conventional edge or line detection techniques, for example. Also in this block 608, properties of the lines may be determined. For example, a rotational orientation of the lines may be determined. Moreover, a relationship of the lines to the mesh may also be established.

Next, at block 610, the detected lines are grouped into a plurality of groupings. These groupings may be according to an orientation of the lines, such that horizontal lines (or lines that would be horizontal but for an unwanted rotation) and vertical lines (or lines that would be vertical but for the unwanted rotation) are grouped separately, with one or more additional bins being provided for oblique lines. In the example framework described above, the lines may be grouped into 90 bins, each bin corresponding to an incremental 2-degrees of rotation, where bins 1 and 90 include horizontal lines and bin 45 includes vertical lines. In other implementations, more or fewer bins may be used.

Upon grouping the lines, the input mesh is optimized at block 612. The optimization is done according to an energy function that treats each of the line groupings separately. In one embodiment, the mesh is optimized such that all lines in each bin are subject to the same rotation, but that each bin is treated separately. Moreover, the lines in certain of the bins are strictly rotated, whereas lines in other bins are rotated to varying degrees.

At block 614, the image content is deformed according to the optimized mesh. For example, the content may be deformed using bilinear interpolation.

Although the above acts are described to be performed by the image rotation correction system 102, one or more acts that are performed by the image rotation correction system 102 may be performed by the client device 104 or other software or hardware of the client device 104 and/or any other computing device (e.g., the server 106), and vice versa. For example, the client device 104 may include a mechanism and/or processing capability to apply a mesh to an image or to extract lines from the image. The client device 104 may then send those images, i.e., with the mesh and/or the extracted lines, to the image rotation correction system 102 for correction.

Furthermore, the client device 104 and the image rotation correction system 102 may cooperate to complete an act that is described to be performed by the image rotation correction system 102.

Any of the acts of any of the methods described herein may be implemented at least partially by a processor or other electronic device based on instructions stored on one or more computer-readable media. By way of example and not limitation, any of the acts of any of the methods described herein may be implemented under control of one or more processors configured with executable instructions that may be stored on one or more computer-readable media such as one or more computer storage media.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A system comprising:
one or more processors;
memory, communicatively coupled to the one or more processors, storing executable instructions that, when executed by the one or more processors, configure the one or more processors to perform acts comprising:
receiving an input image containing original image content, the original image content including a pre-existing rotation about a pre-existing rotation angle;
identifying lines corresponding to linear features in the image content;
fitting a mesh to the image content, the mesh having a mesh boundary corresponding to a boundary of the image content;
grouping the lines in a plurality of groupings comprising one or more oblique groupings and at least one of a horizontal grouping or a vertical grouping;
optimizing the mesh according to an energy function to define an optimized mesh, the energy function comprising:
a rotation preservation term encouraging preservation of a desired rotation of the image content to counteract for the pre-existing rotation about the pre-existing rotation angle;
a line preservation term defining a relationship between the lines and vertexes of the mesh;
a shape preservation term, and
a boundary preservation term to constrain the optimized mesh to the boundary of the image content; and
deforming the image content according to the optimized mesh to produce a corrected image comprising corrected image content, the corrected image content including a corrected rotation about a corrected rotation angle, wherein the corrected rotation angle is less than the pre-existing rotation angle.

2. The system of claim 1, wherein the deforming the original image content includes rotating lines appearing in the corrected image as horizontal or vertical lines by the pre-existing rotation angle.

3. The system of claim 2, wherein the deforming the image content includes rotating lines appearing in the corrected image as oblique lines by an angle other than the corrected rotation angle.

4. The system of claim 1, wherein the corrected image contains all of the original image content of the input image.

5. The system of claim 4, wherein the corrected image contains only the original image content of the input image.

6. The system of claim 1, wherein the optimizing the mesh comprises optimizing the energy function.

7. The system of claim 6, wherein the optimizing the energy function includes using a half-quadratic splitting technique.

8. A computer readable storage device having stored thereon processor-executable instructions that, upon execution, configure a processor to perform acts comprising:
creating an input mesh on an input image, the input image including a pre-existing tilt relative to a desired orientation;
optimizing the input mesh according to an energy function having a rotation preservation term, a line preservation term, a shape preservation term, and a boundary preservation term to create an optimized mesh; and
deforming the image according to the optimized mesh to produce a corrected image, wherein lines in the corrected image are rotated relative to lines in the input image in order to remove at least part of the pre-existing tilt.

9. The computer readable storage device of claim 8, the acts further comprising:
identifying horizontal lines and vertical lines in the input image tilted by a rotation angle relative to a true horizontal; and
identifying oblique lines in the image titled by an angle other than the rotation angle relative to the true horizontal,
wherein the deforming the image according to the optimized mesh causes the horizontal lines and the vertical lines to be rotated by the rotation angle and the oblique lines to be rotated by an angle other than the rotation angle.

10. The computer readable storage device of claim 9, wherein the horizontal lines, vertical lines and the oblique lines comprise line segments, at least some of which are segmented by the input mesh.

11. The computer readable storage device of claim 9, further comprising grouping the horizontal lines, the vertical lines, and the oblique lines in a plurality of groupings.

12. The computer readable storage device of claim 11, wherein the deforming the image according to the optimized mesh causes all of the lines in each of the plurality of groupings to be rotated by a same angle.

13. The computer readable storage device of claim 11, wherein the groupings comprising the oblique lines are characterized by an angle of the oblique lines, and the deforming the image according to the optimized mesh causes lines in adjacent groupings to be rotated by a similar angle.

14. The computer readable storage device of claim 8, wherein the input image is defined by an image boundary and the image boundary is preserved by the boundary preservation term of the energy function.

15. The computer readable storage device of claim 14, wherein the corrected image is bound by the image boundary.

16. The computer readable storage device of claim 8, wherein the shape preservation term includes a similarity transformation for each of a plurality of quadrants of the input mesh.

17. The computer readable storage device of claim 8, wherein the line preservation term incorporates a relationship between lines in the image and vertexes of the mesh.

18. A method comprising:
receiving at an image correction system an image comprising image content, the image content including a pre-existing rotation about a pre-existing rotation angle;
identifying lines corresponding to linear features in the image content;
grouping the lines in a plurality of groupings comprising one or more oblique groupings and at least one of a horizontal grouping or a vertical grouping;
deforming the image content to create a corrected image by rotating the lines in the at least one of the horizontal grouping or the vertical grouping by a first correction rotation angle and rotating the lines in each of the one or more oblique groupings by a second correction rotation angle other than the first correction rotation angle, wherein the first correction angle rotates the lines in the at least one of the horizontal grouping or the vertical grouping to at least one of a horizontal position or a vertical position.

19. The method of claim 18, wherein the image content represents first image content, wherein all of the first image content is preserved in second image content of the corrected image, and wherein the corrected image contains no additional image content.

20. The method of claim 18, wherein the deforming the image content includes deforming the image content about a mesh optimized according to an energy function.

* * * * *